Dec. 11, 1962     K. B. BREDTSCHNEIDER     3,067,763
FLUID SEALING INDICATOR
Filed Oct. 22, 1959
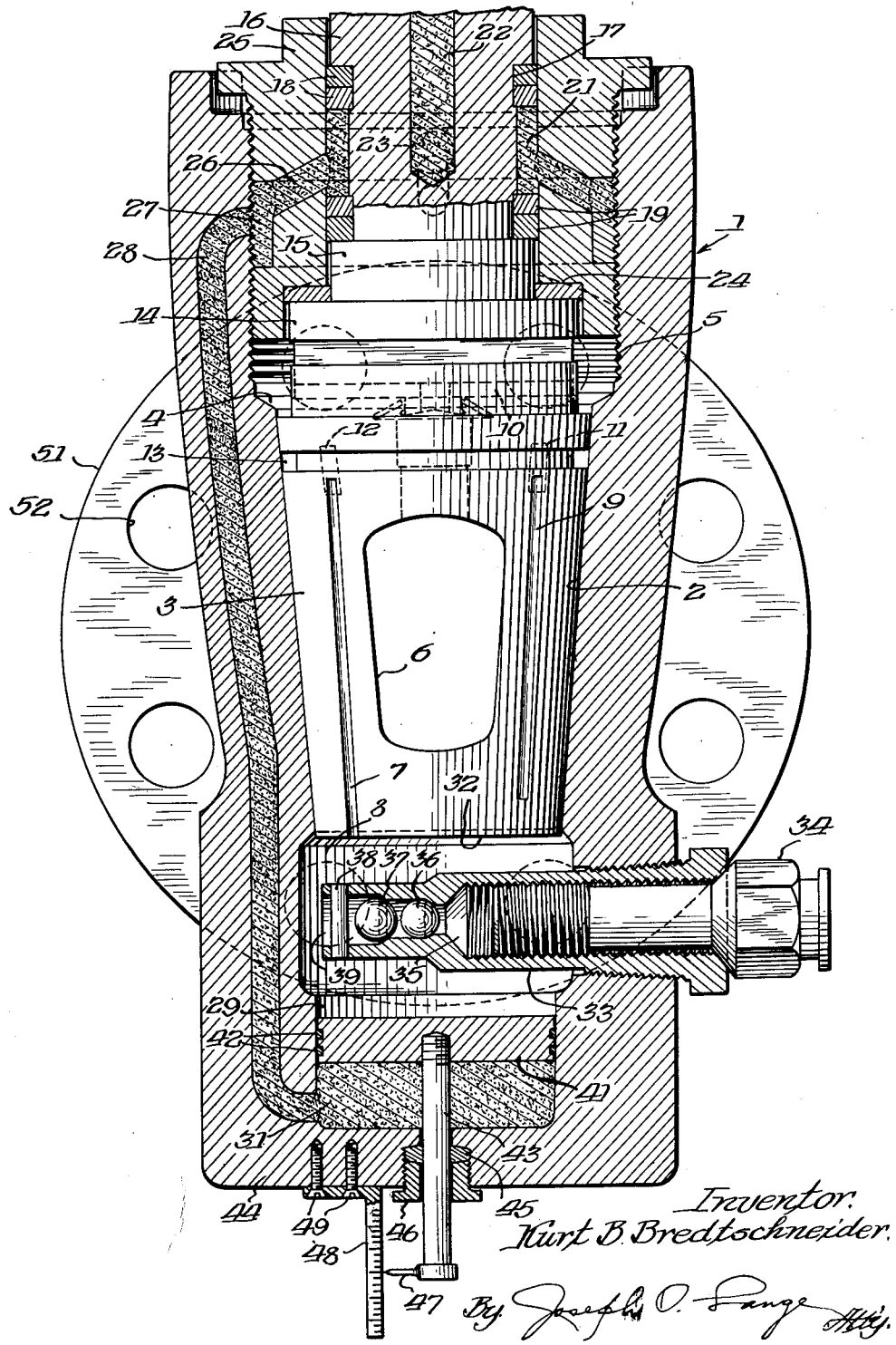
Inventor.
Kurt B. Bredtschneider.
By Joseph O. Lange
Atty.

United States Patent Office 3,067,763
Patented Dec. 11, 1962

3,067,763
FLUID SEALING INDICATOR
Kurt B. Bredtschneider, Chicago, Ill., assignor to Crane Co., Chicago, Ill., a corporation of Illinois
Filed Oct. 22, 1959, Ser. No. 848,026
7 Claims. (Cl. 137—246.11)

This invention relates broadly to a combined measuring and calibrating means for a valve or the like. More particularly, it is concerned with a convenient means for visually determining and measuring the presence in volume or capacity the pressure of a lubricant supply within a pressure vessel, such as a lubricated plug valve, for example, in which both a packing seal may be employed in addition to the lubricant, as will hereinafter become more readily apparent.

Primarily, this invention is concerned with a vessel indicating means in which the amount of lubricant or packing, or both, within the valve casing, for example, is easily and quickly determined merely from external inspection of a suitable comparative volume indicator.

Another object is to provide for an economical indicating mechanism in which the respective supply of two or more media being fed to the valve, such as lubricants and the packing, may be easily and accurately determined upon casual inspection of the valve.

Another object is to provide for a visual indicating means for a valve or the like in which such indicator may be located relatively close to the source of at least one of the media being supplied for lubricating and/or packing the valve.

Another object is to provide for an indicating means of the character hereinafter described in which one side of the vessel chamber separated by a partition afforded by a piston or plunger contains a lubricant and the other side thereof contains a packing so that the relative content of each media within the valve may be easily determined from a superficial inspection of a plunger mechanism, the latter actuated by such fluid supply and providing the chamber partition arrangement described.

Other objects and advantages will become more readily apparent upon proceeding with a description of the invention as set forth in the single FIGURE presenting an embodiment typical of a conventional application.

Referring now to the drawing, a lubricated plug valve is illustrated as one embodiment which may be used, the casing generally designated 1 having the usual frusto-conical or annularly tapered surface 2 upon which to receive the usual lubricated rotatable ported plug or closure member. At the upper end of the frusto-conical or annularly tapered surface portion 2, the casing is provided with the enlarged chamber defined at 4 through which the plug is assembled in the valve body and which chamber also on its outer periphery is internally threaded as at 5 to receive the suitably threaded retaining elements as hereinafter described. The tapered plug or closure member 3 is provided with the through-port transversely extending as at 6 in the usual manner and is also preferably provided with the lubricant grooves 7, one of which connects with the lower chamber 8 of the casing, as shown. Obviously, these grooves may be provided in the body surface 2 or partly in the plug without affecting the application of this invention as hereinafter described. The other lubricant groove vertically disposed at 9 communicates at the upper end with the predeterminately connecting recess 11 in the casing and the groove 7 communicating with the recess 12. It will be appreciated that this lubricating groove arrangement is provided on both the upstream and downstream portions of the valve, the recesses 11 and 12 communicating with the horizontally disposed annular recess 13 of the plug 3. The upper portion of the said plug is provided with the shaft 14 engaging a through-slot or groove indicated in dotted lines at 10. At its upper portion, the said shaft has the reduced portion 15 and the reduced extension 16, having therebetween the annularly recessed surface at 17. The latter surface receives at its upper limits a pair of closely fitting packing rings or end supporting washers 18 and at its lower limits receives the similarly functioning washers 19. A flowing plastic packing is interposed therebetween as designated at 21 and is supplied to the plug and casing chambers by means of the feed passage 22. The latter passage is connected to a suitable pressure source (not shown) for supplying the plastic packing, such as a screw and plunger similar to that hereinafter described for the lubricant supply. It communicates with the radially disposed passages, as indicated in dotted lines at 23. However, before the plastic packing is applied, the thrust washer 24 is positioned upon the annular shoulder of the plug as shown and the threaded adjusting bushing 25 is fitted over the plug extension 15 with the threads engaged as indicated to predeterminately resist the upwardly applied thrust of the plug 3. The said bushing is provided with the radially extending plastic packing conveying passages 26 communicating at their outer limits with the bushing annular chamber 27. The latter annular chamber preferably connects with the body vertically extending passage 28 communicating with the lower plug chamber generally designated 29 to fill the lowermost portion of the said chamber predeterminately with the plastic packing, as indicated at 31. As previously referred to, the casing chamber 29 has the chamber extention portion 8 thereof immediately below the under surface 32 of the plug 3.

It will be clear that in the usual manner for supplying a lubricant, such as grease, to the chamber upper portion 8, a suitable lubricant feed mechanism 33 is employed. It consists of the threaded plunger 34 axially movable inwardly thereby to exert pressure within the chamber 35 and discharge the lubricant past the ball check valves 36 and 37 into the passages 38 and 39 as illustrated. The lubricant chamber 8 is thus filled as well as supplying the supply lubricant to the respective plug and casing channels 7, 9, 11, and 12, thereby to lubricate the plug bearing surface 2.

Interposed between the chambers 31 and 8, a snugly fitted piston 41 is positioned and suitably sealed by means of the O-rings 42. It will be understood that said piston is freely movable reciprocably within the chamber 29 in response to the fluid pressure accumulating both from the packing 21 as well as the lubricant applied to the chamber 8 immediately below the plug 3. On its underside the piston 41 is provided with a combined depending shaft and indicator 43 projecting outwardly through the wall 44 of the casing 1 past the packing 45 and the threaded gland 46. At its lower end, the shaft 43 is provided with the indicating pointer 47. It is apparent that the latter member cooperates with the suitably graduated scale 48 attached as at 49 to the under portion 44 of the casing 1. It will be further apparent that as the piston 41 moves in response to the respective pressures exercised within the packing chamber at 31 below the piston 41 and by means of the lubricant supply to the chambers 8 and 29, it will be comparatively easy to determine accurately which of the respective media, that is lubricant or packing, is in demand for purpose of effecting desired sealing and operation of the plug.

While only a half portion of the casing 1 is illustrated, it will of course be appreciated that the forward portion (not shown) is the same as the end portion illustrated insofar as the section itself is concerned. It will thus be clear also that the valve casing 1 is attached by any suitable means, such as the end flange 51 drilled as at 52 for bolts (not shown) for attachment to a pipe line.

It should now be apparent that by means of the pressure indicating means hereinabove described a most valuable and very significant advantage in the functioning of the valve has been accomplished. Specifically, let it be assumed that there is the indication that the valve is in need of lubrication and it is also noted that the combined lubricant in the chamber 8 plus that in the feed cylinder 33 is apparently insufficient to apply lubricant pressure to the grooves 7 and 9, 11 and 12 through the lubricant chamber 35. It then becomes desirable to reduce the volumetric capacity of the chamber 8. This is easily accomplished by simply backing out or reversing the movement (outwardly) of the plunger 34 which allows for added volume to the chamber 35 to receive lubricant if later required. The piston 41 is then forced upwardly by the addition of more packing beneath it in the chamber 31 by adding packing at the feed chamber 22 at the upper portion of the plug. The combined chambers at 8 and 29 are accordingly substantially reduced in volume. Then lubricant pressure is now applied by the plunger 34 to the reduced chambers and pressure-fed to the channels 7, 9, 11 and 12 to grease the plug adequately without necessity for a new supply of lubricant from a source outside the valve.

Similarly, assume a fluid leak has developed at the packing past plug and bushing surfaces at threads 5 and recessed surfaces 17, packing pressure can be applied by forcing the piston 41 downward by simply adding lubricant to the chambers 8 and 29 through the feed plunger 34 and thus causing pressure to be applied to the packing in the chamber 31 and reverse the movement of the packing in the passages 28, 27, and 21 in the order named, thereby to seal the leaks by the packing load applied at these locations.

In summary, it will now be clear that when employing separate lubricant and packing materials the lubricant duct is connected to one end of the cylinder 29 on one side of the piston 41 and the packing duct to the other end of the said cylinder on the opposite side of the said piston so that the application of additional lubricant or packing material or pressure will create a corresponding increase in the pressure of the other material. For example, rotation of the lubricant injection screw or plunger 34 will not only inject more lubricant into the ducts, but will also place the plastic packing under additional pressure. The visual pointer or indicator 47 is thus employed to show when additional lubricant or packing is needed.

Thus it is clear the packing chambers and channels can be made to function as a reservoir for the lubricant chambers and channels and vice versa.

It will be further understood that while only a single embodiment has been shown and described, the invention is capable of application to a wide variety of devices including pressure vessels such as valves and pumps in which it is desirable to incorporate a dual system for handling a lubricant and plastic packing supply means functioning in the general manner above described. The scope of the invention should therefore be interpreted in light of the claims appended hereto.

I claim:

1. In a pressure vessel, a casing and a rotatable plug closure member comprising an actuating stem therefor and an interface between the said closure member and casing, the combination of a fluid seal indicating means, selective means for supplying multiple fluid sealing means under pressure to said casing and closure member stem and the interface between the casing and closure member, the said fluid indicating means including means responsive to the pressure of said fluid sealing means, the said pressure responsive means having partition means for separating one of said fluid sealing means from the other fluid sealing means, and means associated with said fluid indicating means visible from outside the said casing for indicating the fluid pressure condition of said fluid sealing means on either side of said partition means within the casing, the said latter portion of said fluid indicating means being connected to said pressure responsive means.

2. In a valve, a casing therefor, a rotary closure member within the said casing having a stem for effecting rotation thereof, means cooperating with the said casing and said closure member for supplying a plurality of fluid sealing media under pressure to the said casing and outer annular surfaces of the closure member cooperating with the casing and a portion of said stem, pressure responsive means actuated by said fluid sealing media reciprocally movable in opposite directions within the casing, the said pressure responsive means comprising a single piston means in the casing with one face thereof contacting one of said fluid sealing media and an opposite face thereof contacting the other fluid sealing media, and indicator means on the said casing movable with the pressure responsive means movable in either direction to indicate the maximum pressure condition of the fluid sealing media within the casing above or below said piston means.

3. In a lubricated plug valve, a casing and a rotatable plug closure therefor with a stem and interface between the said closure and casing, the casing having a chamber below the plug closure and a second chamber above said plug closure, the chambers being interconnected through said casing by passage means therein, means for each of said chambers for predeterminately supplying a fluid sealing medium to said stem and interface, single piston means with inner and outer transverse surface portions in one of the chambers responsive to the pressure of fluid sealing medium in both chambers, the inner transverse surface of said piston means being in fluid responsive communication with the fluid sealing medium in the chamber immediately below the said plug closure, the outer transverse surface portion of the said piston means being in fluid responsive communication with the said chamber above said plug closure, and means movable with the said piston means in the chamber below the plug closure for indicating selectively the pressure condition of the fluid sealing medium in either one of the interconnected chambers.

4. In a lubricated plug valve, a casing with a bypass and a rotatable plug closure therefor with an interface therebetween and a stem for rotating the said plug closure, the casing having a chamber below the plug closure and a second chamber above said plug closure, the chambers being interconnected by said casing bypass, a plurality of fluid pressure supply means selectively operable for each of said chambers for predeterminately introducing a fluid sealing medium to the bypass, the stem, the said interface and the said chambers, reciprocally movable means in one of the chambers responsive to the change in pressure of the fluid sealing medium in either one of the chambers supplied by said fluid pressure supply means, and means cooperating with said reciprocally movable means for indicating selectively the pressure condition of the fluid sealing medium in either one of the chambers upon actuation by one of said fluid pressure supply sealing means connected to one of said chambers.

5. In a lubricated plug valve, a casing with a passage for a fluid sealing medium and a rotatable grooved plug closure therefor having a valve stem and an interface between the said closure and casing, the casing having a chamber below the plug closure connected to the closure groove and a second chamber above said plug closure, the chambers being interconnected through said casing passage, feed means for each of said chambers for supplying a fluid sealing medium to the said stem, closure groove, interface and casing passage, piston means below said plug closure responsive to the pressure of fluid sealing medium in both chambers, the said latter pressure responsive means having partitioning means for the casing chamber below said plug closure, the said partitioning means extending transversely to the plug closure central axis to form a plurality of superposed chambers below said plug closure, each of said latter named chambers being supplied predeterminately with the fluid sealing medium whereby to move the fluid sealing medium in the other chamber, and means connected to the partitioning means for indicating selectively the degree of movement of said piston means and the pressure condition of the fluid sealing medium in either one of the chambers.

6. In a valve, a casing therefor, a frusto-conical closure rotatably mounted member within the said casing having a stem with an interface therebetween, means cooperating with said casing and the said closure member for supplying independently at least two fluid sealing media under pressure to the said casing, the casing stem and interface having a chamber below the closure member for receiving a plurality of said fluid sealing media, one of the said fluid sealing media supply means being connected to said chamber pressure responsive means movable in said latter chamber dividing said fluid sealing media and being movable reciprocally in opposite directions in response to the larger of the pressures of the fluid sealing media to indicate the pressure condition within the chamber above and below the pressure responsive means, the said stem cooperating with said casing and closure member in supplying one of said fluid sealing media and indicator means projecting through said casing and being movable with the pressure responsive means to indicate the direction of travel of the pressure responsive means within said chamber.

7. In a combined lubricated and fluid sealed plug valve, a casing with a side disposed passage and a rotatable frusto-conical plug closure therefor with a stem and interface, the casing having a chamber below the plug closure and a second chamber cooperating with said stem above said plug closure, the chambers being interconnected by said disposed passage in the casing, independent means for supplying each of said chambers with a lubricant and a fluid sealing medium, the latter medium moving from either of said chambers to the casing side passage, stem and plug closure, means in the lower one of the said chambers dividing said chamber being responsive to the pressure of fluid sealing medium in both chambers, one of said independent means being located in the inner one of said divided lower chamber portions, the said latter pressure responsive means comprising a reciprocally movable piston closely fitted in the lower one of said chambers and means projecting from the casing for indicating the pressure condition of the fluid sealing medium in one of the chambers, the indicating means being movable with said piston and being guided in its movement by said casing.

References Cited in the file of this patent

UNITED STATES PATENTS

| | | |
|---|---|---|
| 1,932,322 | Nordstrom | Oct. 24, 1933 |
| 2,235,307 | Atkinson | Mar. 18, 1941 |
| 2,410,291 | Kinzbach | Oct. 29, 1946 |
| 2,467,313 | Jacobsen | Apr. 12, 1949 |
| 2,590,583 | Taylor | Mar. 25, 1952 |

FOREIGN PATENTS

| | | |
|---|---|---|
| 256,098 | Great Britain | Aug. 5, 1926 |

UNITED STATES PATENT OFFICE
CERTIFICATE OF CORRECTION

Patent No. 3,067,763                         December 11, 1962

Kurt B. Bredtschneider

It is hereby certified that error appears in the above numbered patent requiring correction and that the said Letters Patent should read as corrected below.

Column 5, line 7, for "rotatably mounted member" read -- member rotatably mounted --; line 11, for "the casing stem and interface" read -- stem and interface, the casing --; column 6, line 3, after "said" insert -- side --.

Signed and sealed this 21st day of May 1963.

(SEAL)
Attest:

ERNEST W. SWIDER
Attesting Officer

DAVID L. LADD
Commissioner of Patents